Figure 1:
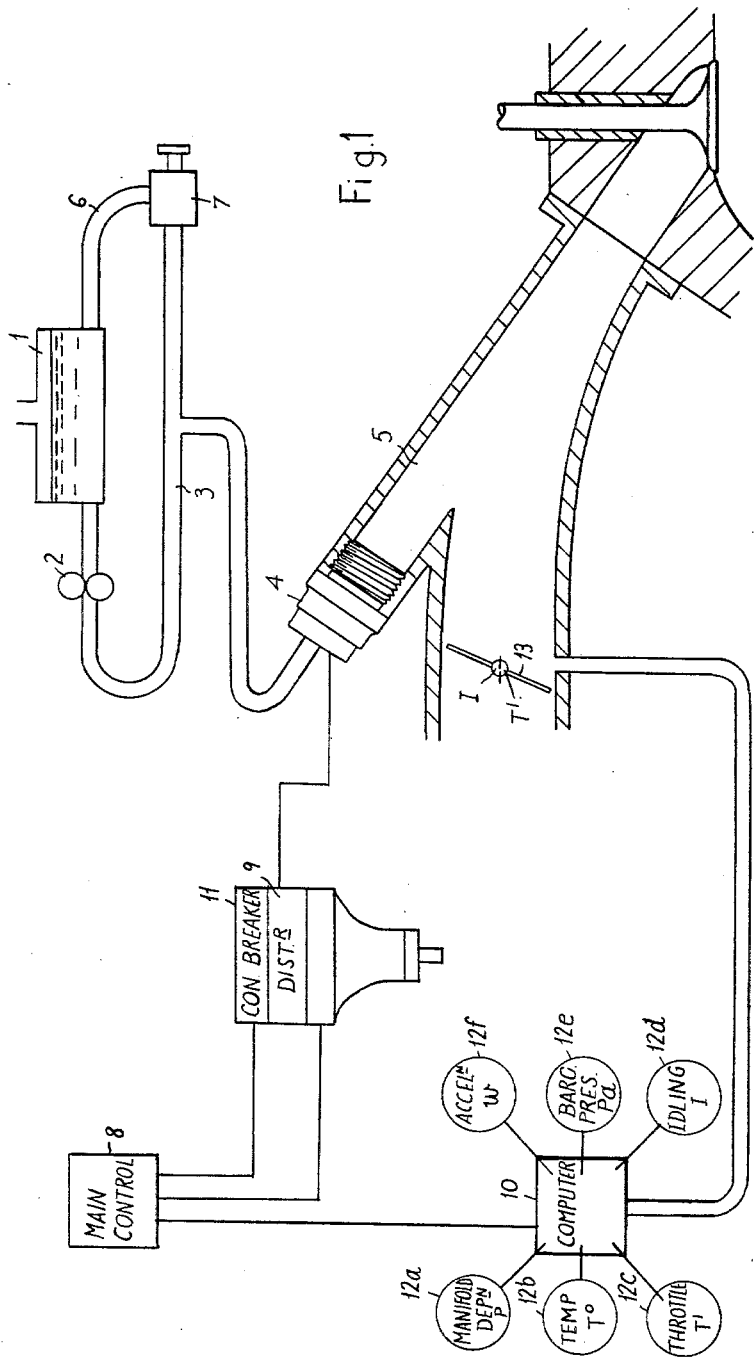

March 15, 1966 K. B. WALLIS 3,240,191
FUEL INJECTION SYSTEMS FOR INTERNAL COMBUSTION ENGINES
Filed May 29, 1963 9 Sheets-Sheet 3

*Inventor*
KENNETH B. WALLIS
By
Holcombe, Wetherill + Brisebois
*Attorneys*

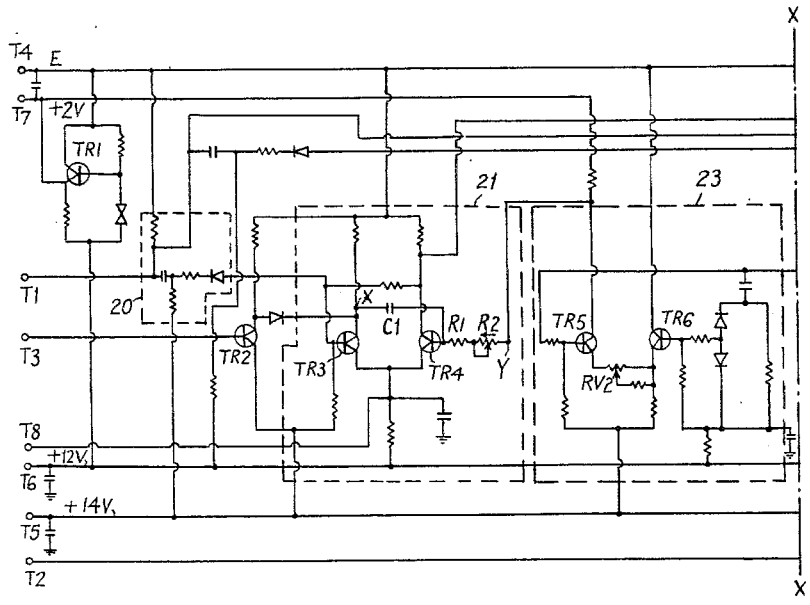
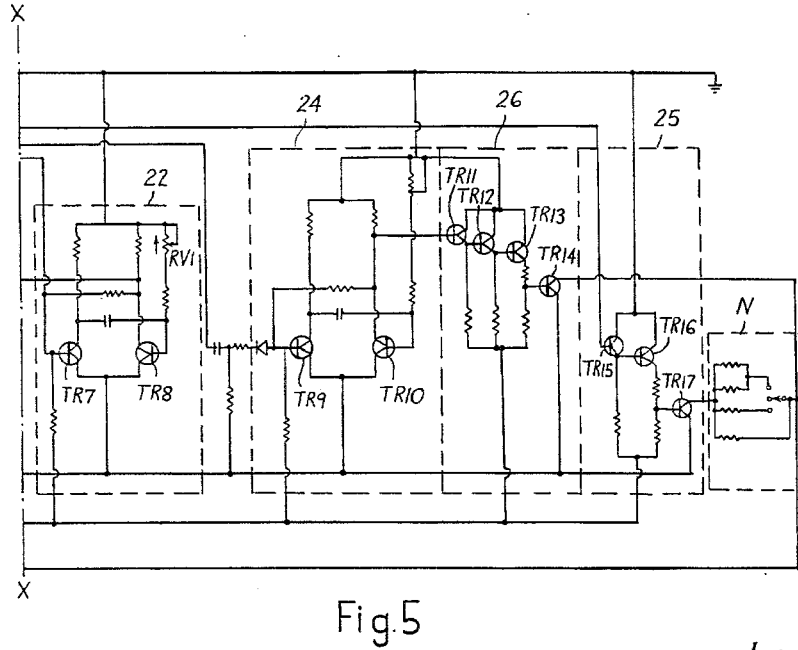
Fig.5

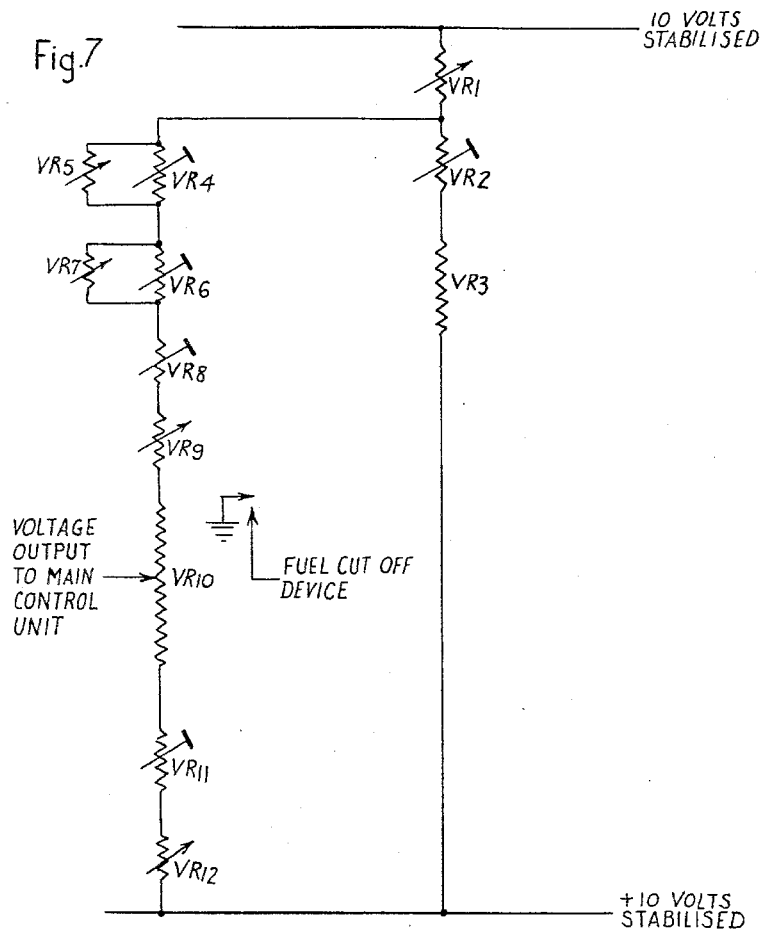
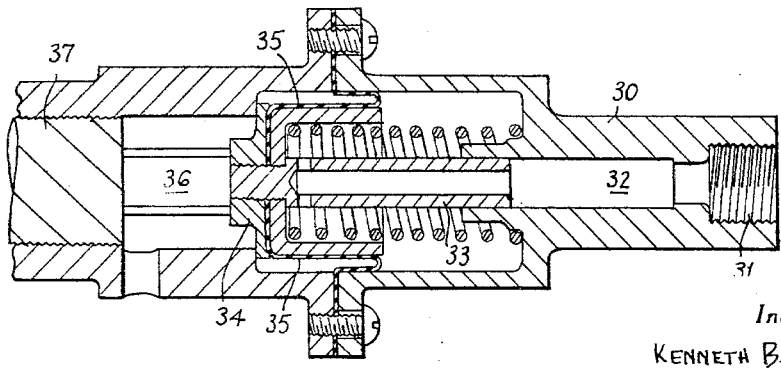

March 15, 1966  K. B. WALLIS  3,240,191
FUEL INJECTION SYSTEMS FOR INTERNAL COMBUSTION ENGINES
Filed May 29, 1963  9 Sheets-Sheet 8
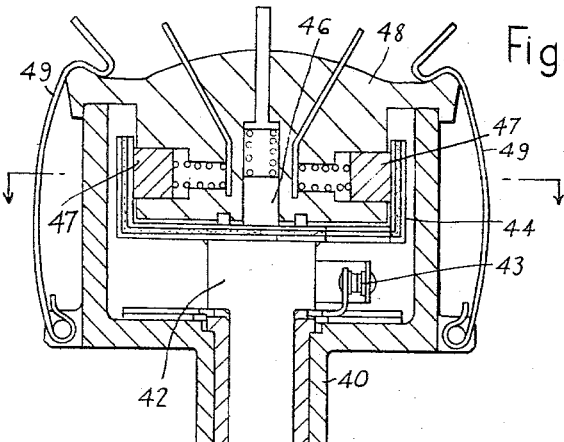
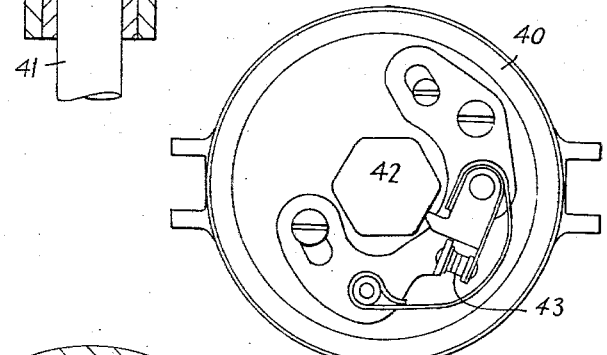
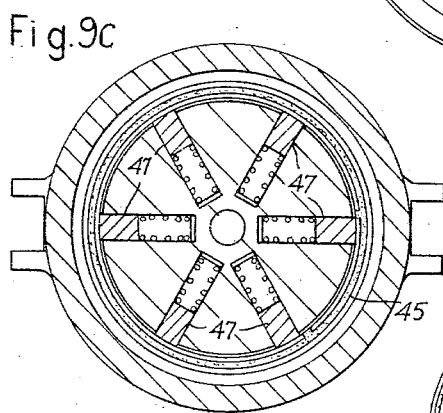
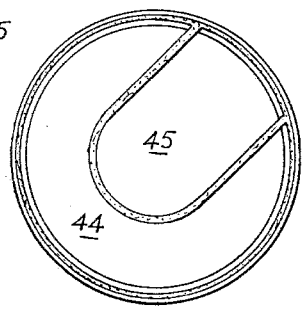
Inventor
KENNETH B. WALLIS
By
Holcombe, Wetherill- Briebois
Attorneys Inventor
KENNETH B. WALLIS
By
Holcombe, Wetherill–Brisebois
Attorneys United States Patent Office 3,240,191
Patented Mar. 15, 1966

3,240,191
FUEL INJECTION SYSTEMS FOR INTERNAL
COMBUSTION ENGINES
Kenneth Basil Wallis, Leamington Spa, England, assignor to Associated Engineering Limited, Leamington Spa, England, a British company
Filed May 29, 1963, Ser. No. 284,031
Claims priority, application Great Britain, June 7, 1962, 22,135/62
4 Claims. (Cl. 123—32)

The present invention relates to fuel injection systems for internal combustion engines.

According to a feature of the invention a fuel injection system for internal combustion engines comprises at least one electromagnetically operated fuel injection valve, a control circuit producing electrical pulses for energising said at least one injection valve so that the valve or a valve is open for the duration of each of the pulses to pass fuel to the engine and a computer fed with a plurality of variable signals representing variations in parameters of the engine operation and controlling the duration of the pulses produced by the control circuit.

According to a further feature of the invention, the control circuit comprises a monostable device, such as a monostable multivibrator, for producing the electrical pulses and the duration of the pulses is varied by varying a voltage or voltages applied to the multivibrator circuit. The multivibrator circuit may include a time constant network comprising series connected elements of resistance and capacity having fixed values or present values which are invariable during the operation of the system.

According to another aspect of the invention, at least one variable voltage is used to control the duration of the output pulses from the control circuit. Two variable voltages may be used, one of these voltages being derived from the output of the computer and the other voltage varying as a function of the speed of rotation of the engine.

According to yet another aspect, the invention provides a fuel injection system for internal combustion engines comprising at least one electromagnetically operated fuel injection valve and a control circuit producing pulses for energising said at least one injection valve so that the valve or a valve is open for the duration of each of the pulses to pass fuel to the engine, wherein each pulse has an initial portion of greater amplitude than the remainder of the pulse so that said initial portion causes rapid energisation of the electromagnet and opening of the valve, the value of the pulse then falling to a lower level which is sufficient to retain the valve open but which enables rapid closing of the valve upon cessation of the pulse.

According to yet another aspect of the invention, the computer for the signals varying with variations in certain parameters of engine operation comprises plural variable resistance devices which are connected in a network across a voltage supply and which provide at least one variable voltage output to the control circuit with variation in any of the engine parameters represented in the computer.

The invention also provides novel constructions of electromagnetically operated fuel injection valves as will hereinafter be described.

Figure 2:
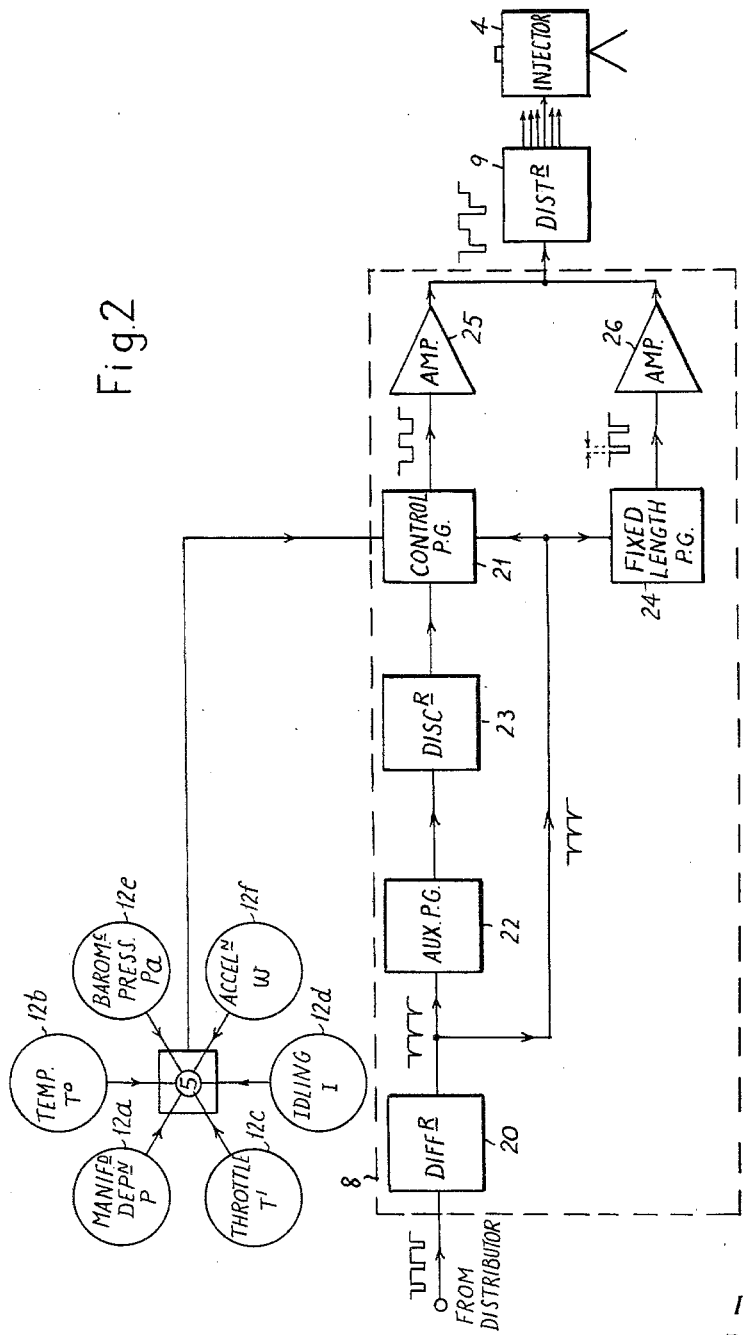
Figure 3:
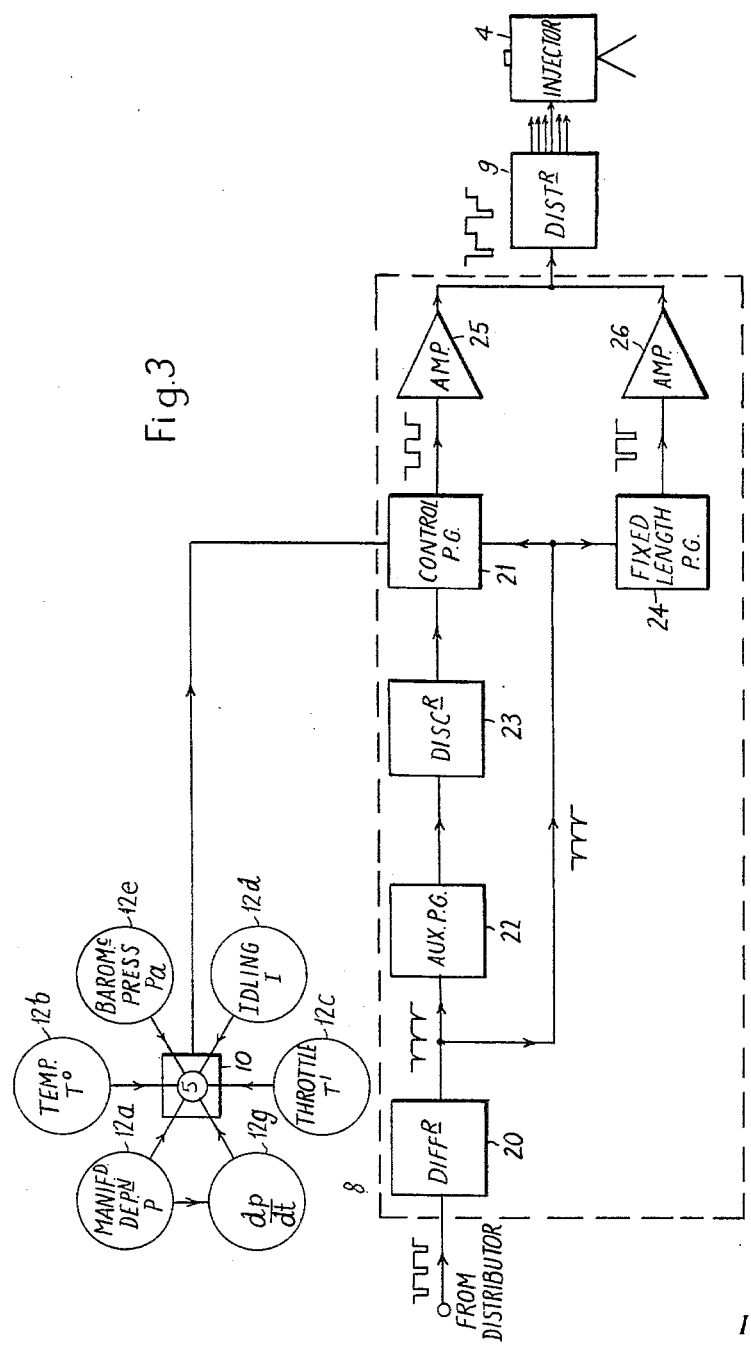
Figure 4:
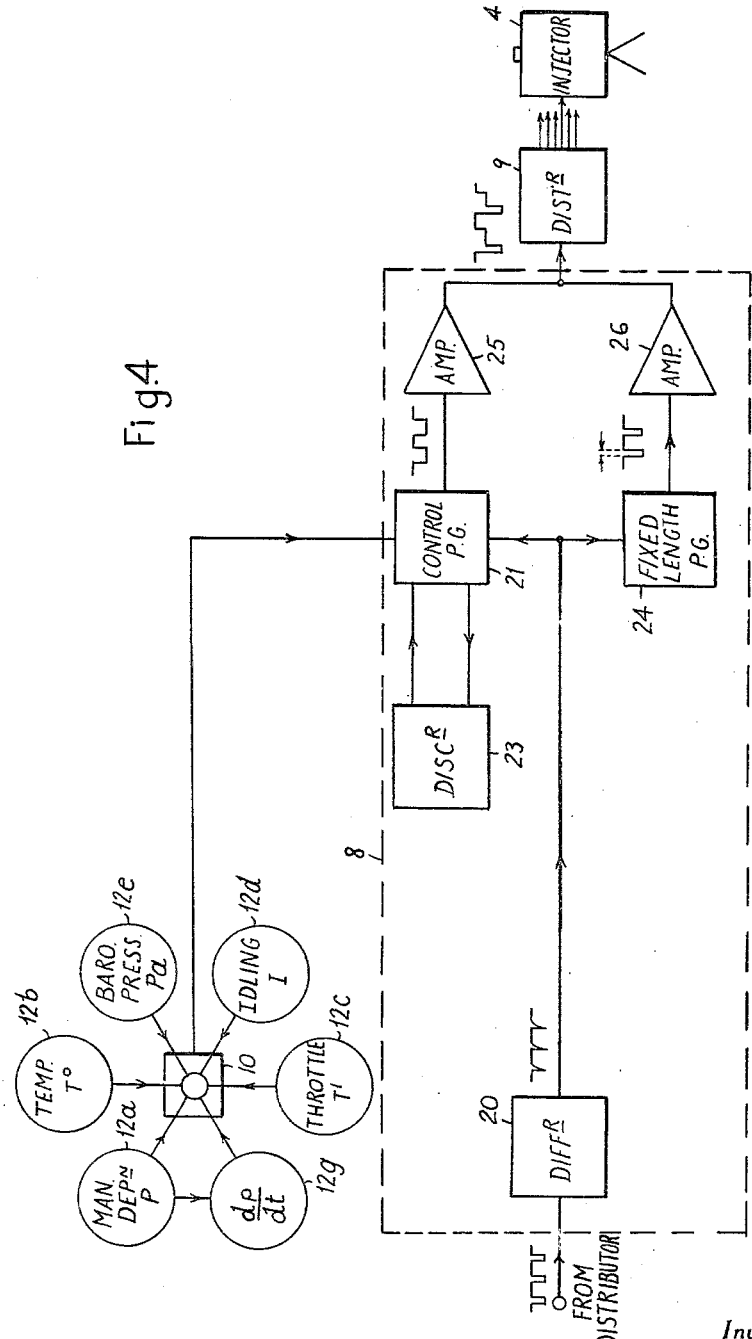
Figure 6:
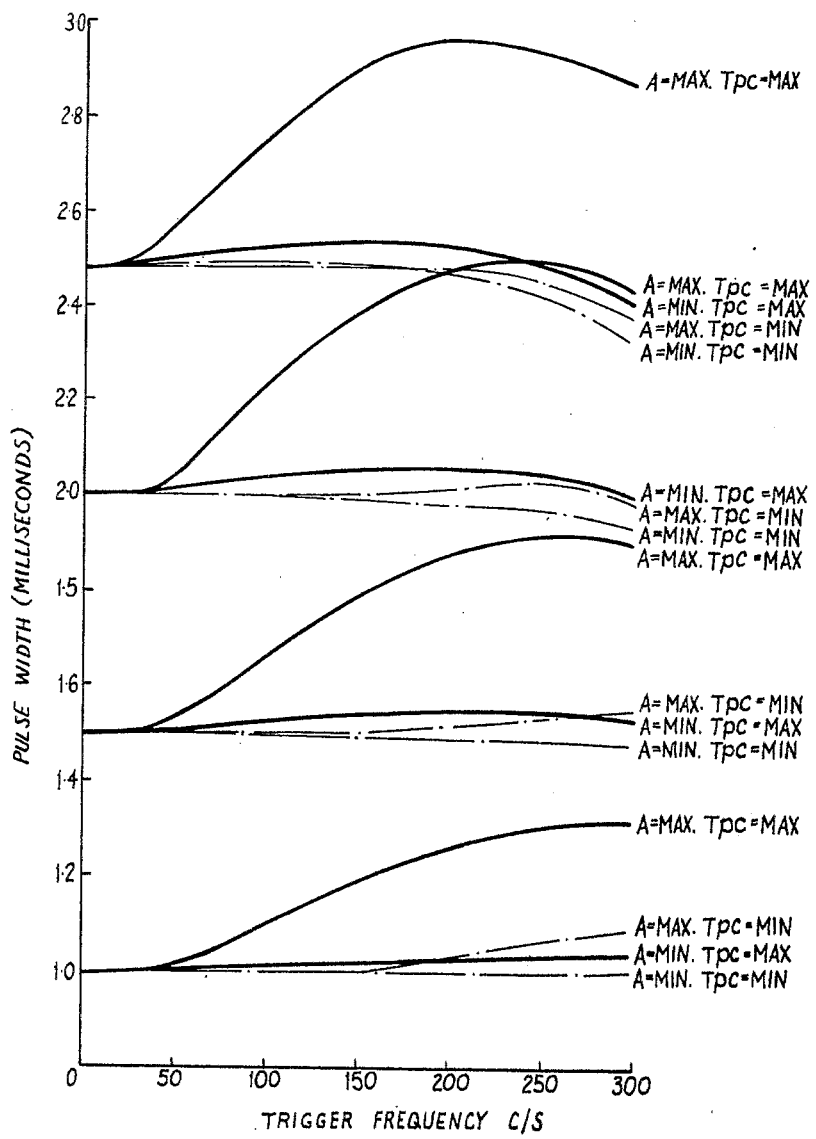
Figure 10:
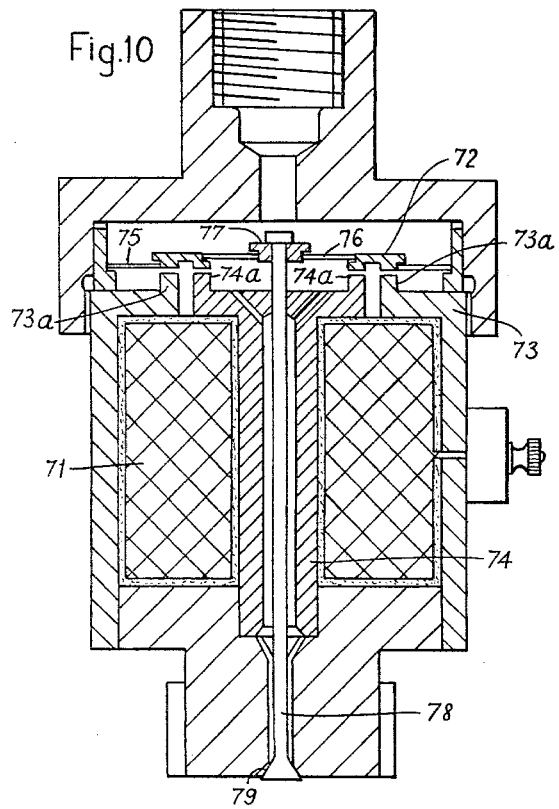
Figure 11:
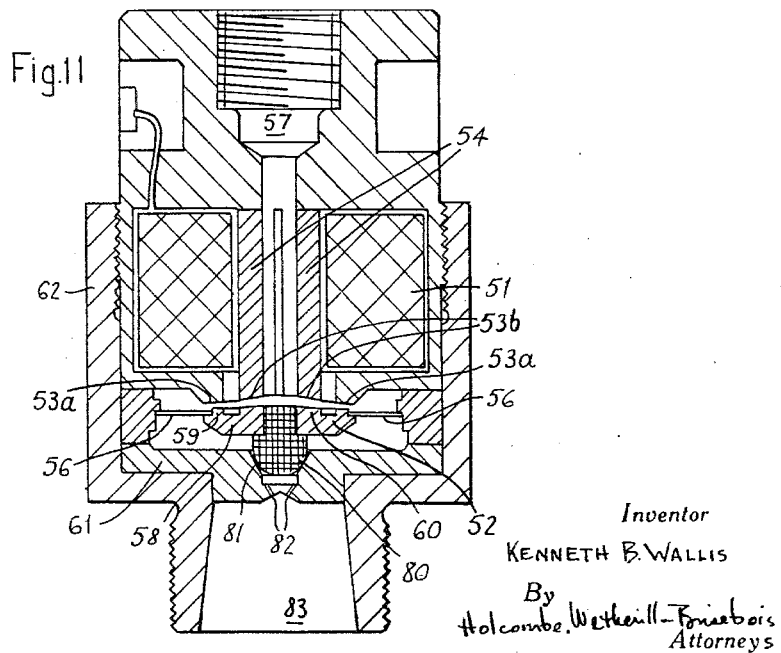

The invention will now be further described, by way of example, with reference to the accompanying drawings in which:

FIGURE 1 is a block diagram of one embodiment of fuel injection system according to this invention, FIGURE 2 is a block circuit diagram of one arrangement of the electrical circuits of the fuel injection system, FIGURE 3 is a block circuit diagram of a further arrangement of the electrical circuits, FIGURE 4 is a block circuit diagram of yet another electrical circuit arrangement, FIGURE 5 is a circuit diagram of one embodiment of the main control circuit, FIGURE 6 is a graph illustrating the performance of the main control circuit, FIGURE 7 is a circuit diagram of one embodiment of computer circuit, FIGURE 8 is a diagram of one embodiment of manifold depression transducer which may be used in the system according to this invention, FIGURES 9a, 9b, 9c, and 9d are views of a pulse distributor and contact breaker which may be used in the circuit according to this invention, FIGURE 10 is a diagram of one embodiment of electromagnetically operated fuel injection valve, and FIGURE 11 is a diagram of another embodiment of electromagnetically operated fuel injection valve.

Referring to FIGURE 1, the fuel injection system illustrated is intended for a multicylinder internal combustion engine and comprises a fuel tank 1 from which fuel is pumped under pressure by the pump 2, through a filter to a common rail 3 supplying fuel at constant pressure to individual fuel injection valves, one of which is shown at 4. Although only one fuel injector is shown a separate injection valve is provided for each cylinder, either mounted in the inlet manifold 5 of the engine as shown, or in the case of direct injection using higher pressures, in the cylinder head or cylinder. A return pipe 6 from the common rail 3 by-passes fuel back to the tank 1 through a relief valve 7 which determines the actual pressure in the rail 3.

Since the injection valves 4 are supplied with fuel at constant pressure, a periodic activation of an injection valve for a time duration dependent upon engine operating conditions will meter the fuel supplied to the engine through each injection valve. Each valve is energised by a current pulse of predetermined duration, which pulse is derived from the main control unit 8 and allocated by the distributor 9 according to the firing sequence of the engine. A quantity of fuel proportional to the electrical pulse duration is delivered in an atomised form into the cylinder through the open inlet valve, or directly into the combustion chamber in the case of the high pressure application at a predetermined point in the engine cycle.

The duration of the pulses fed from the distributor is controlled by the main control unit 8 and the computer 10. These units are themselves triggered from a contact breaker assembly 11 mounted in the distributor housing and operating at the firing frequency of the engine.

The computer 10 is fed with information supplied by a number of transducers 12a to 12f each responsive to one or more conditions of engine operation. In this embodiment the individual transducers are arranged to sense the following conditions of engine operation:

Transducer 12a—Manifold pressure
Transducer 12b—Engine water jacket temperature
Transducer 12c—Full throttle enrichment
Transducer 12d—Idling enrichment
Transducer 12e—Barometric pressure and ambient temperature
Transducer 12f—Acceleration effects (only employed in some cases).

In operation, the driver primarily controls a valve 13, located in the induction manifold from a conventional throttle pedal which in turn influences the behaviour of the transient tranducers in response to the engine operation, and hence the exact fuel quantity is computed by the system to satisfy the required operating condition.

Referring now to FIGURE 2, which is a block circuit diagram of one arrangement for the electrical circuits of the system, the trigger signal produced from the contact breaker 11 in the distributor is fed through the differentiating circuit 20 directly to the control pulse generator 21 to control the start of the control pulse. The differentiated signal is also fed into the auxiliary pulse generator 22 to obtain a signal of suitable form for feeding the discriminator 23 which produces a voltage output which is a function of incoming pulse frequency and hence of engine speed. This latter voltage is fed to the control pulse generator 21 as a control signal and varies the duration of the output pulses from the control pulse generator according to a pre-arranged characteristic which may or may not be also a function of the other voltage input control signal fed to the control pulse generator from the computer 10. As has been explained with reference to FIGURE 1, this latter signal is a function of the following parameters of engine operation: manifold depression, temperature, barometric pressure, acceleration, idling and throttling, in accordance with the varying signals produced by the transducers 12a to 12f.

The output from the control pulse generator 21 is therefore a train of pulses the frequency of which varies with the trigger pulse frequency and the pulse duration of which varies with the amplitudes of the control voltages applied thereto.

The pulse from the differentiating circuit 20 is also fed to a fixed length pulse generator 24, and the output pulses from the control pulse generator 21 and the fixed length pulse generator 24 are respectively amplified in the amplifiers 25 and 26 and are then added together to produce the output pulse train which is applied through the distributor 9 to control the electromagnetically operated fuel injection valves 4. As can be seen from FIGURE 2, the negative going output pulses fed to the distributor 9 are of a stepped character having an initial portion of greater amplitude than the remainder of the pulse. This stepped pulse form is necessary to produce the rapid electromagnetic operation of the injector which is essential to obtain satisfactory high speed performance of an engine.

FIGURE 3 shows a modified circuit arrangement wherein the transducer 12f producing a signal representing acceleration, is omitted and is replaced by a differentiating circuit 12a producing a signal which is the first derivative of manifold depression. Apart from this modification, the circuit is the same as FIGURE 2.

In the circuit arrangement of FIGURE 4, similar parameters are employed in the computer to those employed in the circuit of FIGURE 3. In this embodiment however the auxiliary pulse generator 22 is omitted and the discriminator 23 is fed from the pulse produced in the control pulse generator 21. The output voltage from the discriminator 23 is fed as a variable voltage into the control pulse generator 21.

Referring now to FIGURE 5, this is a circut diagram of one embodiment of the main control unit 8 as employed in the arrangement of FIGURE 2. The control pulse generator 21 is a monostable multivibrator employing transistors TR3 and TR4, and incorporates a time constant circuit comprising the series connnected capacitor C1 and resistors R1, R2. The resistor R2 shown as preset is only adjusted during initial setting up of the system to suit the characteristics of a particular engine and thereafter is not adjusted or may be replaced by a fixed resistor of suitable value. This multivibrator circuit is fed with pulses from the distributor 9 which are a function of the engine speed and which are derived from termnial T1 through the differentiating circuit 20. The variable output voltage from the computer 10 is fed to the multivibrator via terminal T3 and amplifier transistor TR2. A further input voltage to the multivibrator which is a function of engine speed is derived from the discriminator 23. The voltages from the computer 10 and discriminator 23 are respectively applied to the points X and Y at opposite ends of the time constant circuit of the multivibrator.

The time for one complete cycle of operation of the multivibrator i.e. the pulse duration is primarily dependent upon the charging time of the capacitor C1 through the resistors R1, R2 to a potential V1 when the potential difference is $V1+V2$. The transistor TR3 is held in the "off" condition whilst the other transistor TR4 is held in the "on" condition. When the transistor TR3 is suddenly turned on by a differentiated trigger pulse from the distributor, the base of transistor TR4 is pulled positive by an amount approximately equal to V1. Transistor TR4 is turned off and its collector swings negative this swing being fed back to transistor TR3. This feedback keeps the transistor TR3 in the "on" condition after the trigger pulse has disappeared. The negative swing at the collector of the transistor TR4 is used as the output pulse and this transistor will stay in the "off" condition until capacitor C1 is charged to a potential slightly negative with respect to earth. The unit will then return very rapidly to its original condition and will remain in this condition until the next triggering pulse is received.

The auxiliary pulse generator 22 comprising transistors TR7 and TR8 and the fixed length pulse generator comprising transistors TR9 and TR10 are generally similar to the main pulse generator 21 and will not be described in detail. Their output is synchronised with engine speed but their pulse duration is not variable. The auxiliary pulse generator 22 produced constant amplitude pulses the leading edges of which coincide with the leading edges of the pulse from the main control pulse generator 21 and which are used to drive the discriminator 23. The pulse width can be preset between desired limits, for example between 1.5 ms. and 2.7 ms., by means of RV1. The fixed length pulse generator 24 generates a relatively short duration large amplitude pulse which is added to the pulse from the main pulse generator 21 to produce the initiating large amplitude current drive at the beginning of the pulses fed to the fuel injection valves. The pulses from this circuit can also be preset between desired limits, for example between 0.25 ms. and 0.7 ms.

The discriminator comprising transistors TR5 and TR6 is supplied with a constant amplitude pulse from the generator 22. The output from the discriminator is a positive going pulse, the amplitude of which is a function of engine speed. The discriminator gain is controlled by RV2. This pulse represents voltage V2 applied to the control pulse generator 21 at point Y.

The power amplifier 25 comprising transistors TR15, 16 and 17 is fed from the control pulse generator 21 and will produce, for example, on demand a maximum pulse of 3 ms. duration, 5 amps amplitude at a maximum frequency of 300 c./s. The power amplifier 26 comprising transistors TR11, TR12 and TR13 is fed from the fixed length pulse generator 24 and will produce on demand a pulse of 0.7 ms. duration, 25 amps at a maximum frequency of 300 c./s. This constitutes the high amplitude initial portion of the stepped pulses fed to actuate the injection valves.

The output pulses from the two amplifiers 25 and 26 are combined to produce the stepped pulses which are applied to the distributor via terminal T2, and from the distributor to the fuel injection valves. The network N incorporating selector switch SW1 enables the output pulse to be set up correctly, for any particular type of engine and may be replaced by a suitable fixed resistor or resistors once setting up is achieved.

FIGURE 6 is a graph illustrating the performance of the main control unit. The output pulse width is a function of the output from the computer and of the trigger frequency which in turn is a function of engine speed.

The curves show the changes in pulse width applied to the solenoids with the changes in engine speed (trigger frequency). The gain of discriminator 23, which can be varied by RV2, is represented by A and curves in full lines are shown for maximum and minimum values of A with maximum values of T$pc$ (which represents the width of the pulses fed to the discriminator from the auxiliary pulse generator 22 and which can be varied by RV1) and curves in broken lines are shown for maximum and minimum values of A with minimum values of T$pc$. Four sets of such curves are shown for different outputs from the computer. The controls RV1 and RV2 are pre-set to suit the parameters of the engine with which the system is operating.

One embodiment of the computer will now be described with reference to FIGURE 7. As illustrated this circuit comprises a plurality of variable resistance devices connected in a chain across a stabilised voltage supply. These resistance devices vary in response to the following parameters of engine operation:

VR1—Barometric pressure and ambient temperature correction
VR5—Water temperature thermistor
VR7—Acceleration transducer
VR9—Idling enrichment
VR10—Manifold pressure transducer
VR12—Power correction The resistors VR2, VR8 and VR11 serve as trimming resistors, VR3 is a ballast resistor, whilst resistors VR4 and VR6 are shunts.

The computer is essentially an analogue voltage computer, using as input data, signals from a number of transducers and producing as an output a voltage level which is acceptable to the main control unit 21 which level can be expressed as $f(T°, Pa, W, I, T^1)$. It is now proposed to describe the general action of individual data units, in the order of the function expression.

(i) $f(P)$ Manifold pressure

The variable of manifold pressure is frequently referred as manifold depression, but it is more usefully reasoned in terms of manifold pressure absolute. In common with most fuel injection systems, this variable is used as the basic control data, being a signal of linear fuel relationship and having abundant useful mechanical energy. It takes the basic base load and transient control of the whole systems and is only modified by other data as algebraic or multiplier terms. It deviates from linearity only towards the full throttle condition under the influence of $T^1$.

The data of $f(P)$ may be taken from a piston, bellows or diaphragm assembly used to urge a suitably coupled potentiometer.

(ii) $f(T°)$ Water manifold and atmospheric temperature

These two variables are applied to the computer in the form of a voltage shift to the transducer $f(P)$. They can be primarily summed and applied as a datum shift to $f(P)$ or presented as shunt form to an auxiliary potentiometer or resistance in the voltage summation.

An example of their application can be represented by a thermistor or similar temperature sensitive device.

(iii) $f(Pa)$ Barometric pressure

The data output from this transducer is a voltage signal dependent on the environmental atmospheric conditions, themselves dictated by day to day atmospheric conditions and operation altitude.

The correction is in the form of a datum shift or multiplier applied to $f(P)$ and being of linear nature is readily acceptable to the inherent linearity of the system as a whole.

The necessary data can be obtained from a pressure sensitive capsule coupled to a potentiometric device.

(iv) $f(W)$ Acceleration

Acceleration for this application is defined as an increased power demand on the engine expressed as a transient form. It is arranged that a positive rate of change in $f(P)$ effects a datum shift in $f(P)$. The fuel enrichment as a transfer function from the lean cruise mixture to the required power air/fuel ratio can thus be determined accurately.

This data may be taken from a diaphragm type transducer responsive to rate of change of $f(P)$.

(v) $f(I)$ Idling

Enrichment during this condition is provided by a positive voltage level shift actuated by the throttle stop as distinct from a datum shift of $f(P)$. Enrichment is determined as a pre-set control to overcome the prestroke poisoning commonly known as exhaust dilution.

(vi) $f(T^1)$ Throttle $f(P)$ is arranged to provide the lean mixture cruise fuel progressively in a linear manner to a point approaching the full throttle condition. Towards this condition a datum shift of $f(P)$ is superimposed to accommodate high power operation. This effect may be obtained by a suitably linked throttle potentiometer or by change of rate of $f(P)$.

Referring now to FIGURE 8 there is shown an embodiment of manifold pressure transducer which may be employed in the system according to this invention and which is adapted to be connected to the engine manifold on the downstream side of the throttle control valve. The transducer comprises a two-part casing 30 having an inlet 31 for connection to the manifold and which communicates with a passage 32 in which slides a plunger 33. The plunger is formed with a housing 34 at one end which serves as a clamp for one edge of a rolling bellows 35 whose other edge is clamped between the two parts of the casing 30. The housing also carries a rod 36 which is connected to the slider (not shown) of a variable resistor 37 which has its resistance track formed on the internal surface of its cylindrical body. The slider moves over this resistance track which constitutes, for example, the variable resistor VR10 of FIGURE 7. In operation variation in manifold pressure will cause the plunger 33 to slide backwards and forwards in the passage 32, so varying the position of the slider on the resistor.

Referring now to FIGURES 9a, 9b, 9c and 9d, the distributor and contact breaker comprises a casing 40 through which extends a shaft 41 driven by the engine and provided with a cam portion 42 operating a make-and-break contact 43. This portion constitutes the contact breaker 11 of FIGURE 1, which produces the input pulses fed to the main control unit 8 (terminal T1 on FIGURE 5). The driving shaft 41 also carries a metal cup shaped member 44 having an isolated segment 45 which makes contact with a central brush 46 mounted in the cover 48 of the distributor. A plurality of brushes 47 are also arranged radially in the cover at equal angular spacings, six being shown in the present embodiment which is intended for use with a six-cylinder engine. The central brush 46 is connected to the output from the main control unit 8 (terminal T2 of FIGURE 5) and successively feeds pulses from the main control unit to operate the different electromagnetic injection valves as the cup rotates to connect the segment 45 to each of the radial brushes 47 in turn. It will be seen that the segment 45 is of such a radial extent that it only contacts one of the radial brushes 47 at any one time. Spring clips 49 serve to retain the cover 48 in position.

FIGURE 10 is a diagram, in cross-section, of one embodiment of electromagnetically operated fuel injection valve. This injector comprises a body 73 containing a solenoid coil 71 on a core 74. Armature 72 is connected to pintle needle 78 extending through the bore of the solenoid core. The operating coil 71 under the condition of current flow forms an area of high magnetic flux intensity across the two gaps between the armature 72 and the body 73 and core 74, thus urging the armature into contact with the pole pieces 73a and 74a. The armature is moved into this contact position against the force of a high rate spring 75. In this position the valve 79 is open and the inner spring 76 is relieved of some pretension whilst the centre member 77 is thus free to deflect under the force exerted by the fuel pressure on the pintle needle 78, as it flows through the bore in core 74. Thus whilst under the influence of current the injector assembly works as a normal pintle nozzle. When the current supply is interrupted the armature 72 is pulled away from the pole pieces 73a, 74a by spring 75 and delivery of fuel ceases as the pintle needle 78 closes valve 79. When the armature 72 is in contact with the pole pieces 73a an air gap remains between the inner land of the armature and the pole pieces 74a of the core 74.

This type of injector is also arranged to work on a stepped pulse waveform as herein described.

Referring now to FIGURE 11, this embodiment of injector basically comprises a body 62 containing a solenoid coil 51 mounted on a core 54, and an armature 52 as well as discharge nozzles 82. A current applied to the solenoid winding 51 produces an area of high magnetic flux density across the two gaps formed between the armature 52, and the pole pieces 53a and 53b of the main solenoid core 54. This magnetic force acts on the armature 52 to draw the seal 80, made for example of nylon, out of engagement with a sealing 81 against the action of a high rate spring 56. Fuel now flows to the small divergent discharge nozzles 82 formed in plate 61 attached to the valve body 62. The fuel escapes from the small nozzle holes with high velocity. Upon emergence to the part conical chamber 83 the various jets of fuel impinge upon each other and their energy is largely absorbed in atomisation. By variation in the angle of the holes in nozzles 82 and by the possible addition of a centre hole the ultimate spray pattern can be adjusted at will. Conversely, when the current flow is cut off from the solenoid winding, the armature 52 returns under the influence of spring 56 to allow seal 80 to seal off the nozzles 82. Thus fuel under pressure in conduit 57 is discharged through the metering nozzles 82 in the time interval between the armature leaving its seat and returning to rest on the face of the nozzles.

The magnetic path is designed such that an operating time equivalent to half the minimum pulse duration effects a saturated condition in the material at the necked portion 58 of the armature under the influence of the initial high amplitude portion of the stepped pulse applied to energise the solenoid.

The device is so arranged that when the armature 52 is attracted the outer land 59 of the armature makes contact with the pole pieces 53a formed on the body 54 of the solenoid, but that a non-magnetic gap remains between the inner land 60 of the armature and the pole pieces 53b, thus decreasing the retentivity of the magnetic circuit.

The device is also constructed so that the lands 59, 60 of the armature 52 are not parallel to the face of the solenoid, thus increasing the effective area and providing a centering action. The spring 56 is clamped at its outer diameter to provide a higher rate effect.

Whilst particular embodiments have been described it will be understood that various modifications may be made without departing from the scope of this invention. Thus the computer may only handle a smaller number of variable engine parameters. Also changes may be made in the construction and arrangement of the electronic circuits and fuel injection valves.

Furthermore the main control unit 8 and the computer 10 may be triggered by other means than the contact breaker assembly 11. Thus they may be triggered by the signal produced by magnetic or capacitive pick-up means, or from an electro-optical pick-up arrangement associated with the distributor or engine flywheel.

I claim:

1. A fuel injection system for internal combustion engines comprising at least one electromagnetically operated fuel injection valve, a control circuit producing electrical pulses for energizing said at least one injection valve, so that said valve is opened for a period depending on the duration of each of the pulses to pass fuel to the engine, said control circuit comprising a timing circuit consisting only of components having values which are invariable during the operation of the system and means for feeding said timing circuit with at least one variable voltage which varies as a function of at least one parameter of engine operation to control the duration of the output pulses fed to energize said at least one injection valve and wherein at least one variable voltage fed to the timing circuit is derived from a computer device, independent of the control circuit and comprising a plurality of variable resistance devices connected across a voltage supply, and means for respectively varying said resistance devices in response to different parameters of engine operation.

2. A system as claimed in claim 1, in which two variable voltages are respectively fed to different points on the timing circuit.

3. A system as claimed in claim 2, in which one of said variable voltages varies as a function of the speed of rotation of the engine and the other variable voltage is derived from the computer device.

4. A system as claimed in claim 3, in which the control circuit is triggered by pulses produced upon rotation of the engine and including a discriminator fed with signals produced in the control circuit and producing a variable output voltage which varies as a function of the speed of rotation of the engine and which is in turn fed back to the control circuit.

References Cited by the Examiner

UNITED STATES PATENTS

| | | | |
|---|---|---|---|
| 2,310,773 | 2/1943 | Fuscaldo | 123—32 |
| 2,815,009 | 12/1957 | Pribble | 123—32 |
| 2,883,976 | 4/1959 | Woodward et al. | 123—32 |
| 2,884,916 | 5/1959 | Winkler | 123—32 |
| 2,936,744 | 5/1960 | Paule et al. | 123—32 |
| 2,941,519 | 6/1960 | Zechnall et al. | 123—32 |

FOREIGN PATENTS

| | | |
|---|---|---|
| 858,966 | 1/1961 | Great Britain. |

MARK NEWMAN, *Primary Examiner.*

RICHARD B. WILKINSON, *Examiner.*